(12) United States Patent
Hata et al.

(10) Patent No.: US 6,433,996 B1
(45) Date of Patent: Aug. 13, 2002

(54) ELECTROLYTE COMPOSITION FOR ELECTRIC DOUBLE LAYER CAPACITOR, SOLID POLYMER ELECTROLYTE, COMPOSITION FOR POLARIZABLE ELECTRODE, POLARIZABLE ELECTRODE, AND ELECTRIC DOUBLE LAYER CAPACITOR

(75) Inventors: Kimiyo Hata; Takaya Sato, both of Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/701,034

(22) PCT Filed: Mar. 22, 2000

(86) PCT No.: PCT/JP00/01732

§ 371 (c)(1),
(2), (4) Date: Nov. 22, 2000

(87) PCT Pub. No.: WO00/57439

PCT Pub. Date: Sep. 28, 2000

(30) Foreign Application Priority Data

Mar. 23, 1999 (JP) ............................................ 11-078085

(51) Int. Cl.⁷ ............................ H01G 9/00; B21F 41/00
(52) U.S. Cl. ...................... 361/502; 361/508; 361/509; 361/523; 361/528; 29/25.03
(58) Field of Search ................................ 361/502, 503, 361/504, 508, 510, 512, 518, 523, 528, 509, 505; 29/25.03

(56) References Cited

U.S. PATENT DOCUMENTS

| 5,069,815 | A | * | 12/1991 | Aoki et al. ............ 252/301.36 |
| 5,538,811 | A | | 7/1996 | Kanbara et al. |
| 5,621,607 | A | * | 4/1997 | Farahmandi et al. ........ 361/502 |
| 6,043,975 | A | * | 3/2000 | Kanbara et al. ............ 361/502 |
| 6,096,456 | A | * | 8/2000 | Takeuchi et al. ............ 429/249 |
| 6,280,878 | B1 | * | 8/2001 | Maruyama et al. ......... 429/233 |

FOREIGN PATENT DOCUMENTS

| EP | 0492858 | 7/1992 |
| JP | 2-138364 | 5/1990 |
| JP | 2-52196 | 6/1990 |
| JP | 5-82512 | 7/1993 |
| JP | 6-45190 | 2/1994 |
| JP | 8-64028 | 3/1996 |
| JP | 9-309173 | 12/1997 |
| JP | 10-214753 | 8/1998 |
| JP | 11-40132 | 2/1999 |
| JP | 11-204116 | 7/1999 |
| WO | WO 97/35351 | 9/1997 |

* cited by examiner

*Primary Examiner*—Anthony Dinkins
*Assistant Examiner*—Nguyen Ha
(74) *Attorney, Agent, or Firm*—Birch, Stewart, Kolasch & Birch, LLP

(57) ABSTRACT

An electrolyte composition and a solid polymer electrolyte for electric double-layer capacitors are each composed of a polyurethane polymeric compound and an ion-conductive salt. A substituent having a large dipole moment has been introduced onto the polyurethane molecule, as a result of which the polyurethane polymeric compound exhibits a high dielectric constant and retains the ability to dissolve an ion-conductive salt to a high concentration, has excellent adhesive properties that enable it to firmly bond large surface area materials and conductive materials, and moreover has an interfacial impedance comparable to that of electrolyte solutions. The invention is also directed at a polarizable electrode-forming composition and a polarizable electrode composed primarily of a polyurethane polymer compound, a large surface area material and a conductive material. The invention additionally discloses a high-performance electric double-layer capacitor arrived at using the above compositions and components.

20 Claims, No Drawings

ELECTROLYTE COMPOSITION FOR ELECTRIC DOUBLE LAYER CAPACITOR, SOLID POLYMER ELECTROLYTE, COMPOSITION FOR POLARIZABLE ELECTRODE, POLARIZABLE ELECTRODE, AND ELECTRIC DOUBLE LAYER CAPACITOR

This application is the national phase under 35 U.S.C. §371 of PCT International Application No. PCT/JP00/01732 which has an International filing date of Mar. 22, 2000 which designated the United States of America, the entire contents of which are hereby incorporated by reference.

BACKGROUND OF THE INVENTION

1. Technical Field

The present invention relates to electrolyte compositions and solid polymer electrolytes for electric double-layer capacitors that are highly suitable for use in such applications as backup power supplies for various types of electronic equipment. The invention also relates to polarizable electrode-forming compositions and polarizable electrodes, as well as to electric double-layer capacitors arrived at using the above compositions and components.

2. Background Art

Electric double-layer capacitors are currently employed as backup power supplies for memory in computers. These capacitors, which make use of the electric double layer that forms at the interface between an electrode and a liquid electrolyte, have a small size, a large capacitance and a long cycle life.

Recent rapid advances in portability and cordless features in consumer electronic devices such as mobile phones have led to a heightened demand for electric double-layer capacitors. Because electric double-layer capacitors which use nonaqueous electrolytes have a higher voltage and energy density than those made using aqueous electrolytes, they are viewed as especially promising and have been the object of accelerated research efforts.

Secondary cells have hitherto been used for such applications. However, electric double-layer capacitors have come into widespread use as lower power consumption by electronic equipment has reduced backup current requirements, and because of the longer cycle life and broader service temperature range of the capacitors themselves.

Such electric double-layer capacitors have a construction in which a positive and a negative electrode (polarizable electrodes) are provided on a left-right pair of current collectors.

The positive and negative electrodes (polarizable electrodes) have been built by adding a conductive material to a large surface area material such as activated carbon to improve the conductivity of the electrode, and using a binder to support the mixture on a current collector such as aluminum foil.

In this case, a separator lies between the positive and negative electrodes. The electrodes and the separator are generally impregnated with an electrolyte solution.

However, in such prior-art electric double-layer capacitors, adhesion and tackiness between the pair of electrodes and the electrolyte (separator) is low. This has an especially large impact in film-type electric double-layer capacitors.

That is, film-type electric double-layer capacitors, as noted above, have a positive electrode/electrolyte (separator)/negative electrode construction. Unlike cylindrical capacitors in which the positive electrode/electrolyte (separator)/negative electrode composite is coiled and placed in a case, the absence of a coiling pressure in film-type capacitors means that pressure is not applied between the positive electrode and the electrolyte and between the electrolyte and the negative electrode, allowing the electrolyte to separate readily from the positive and negative electrodes. Thus, the electrolyte (separator) placed between the positive electrode and the negative electrode, in addition to serving as an electrolyte, must also have the ability to strongly bond the positive and negative electrodes. In other words, it must have adhesion and tackiness.

Examples of binders used in electric double-layer capacitors to support a slurry of carbon material such as activated carbon on the metal current collector include polytetrafluoroethylene, polyvinylidene fluoride, polyvinyl pyrrolidone and carboxymethylcellulose. Of these, polyvinylidene fluoride has excellent film-formability.

However, none of these binders have the ability to dissolve ion-conductive salts to a high concentration. Nor does the binder itself have a high ionic conductivity. Moreover, these binders are unable to simultaneously satisfy the requirements for strong adhesion to the current collector, low dc resistance, and large electrostatic capacitance.

In addition, to lower the interfacial resistance between the electrodes and the electrolyte (separator), it is desirable for the same polymer used in the electrolyte to serve also as an electrode binder resin.

Such an electrode binder must retain the ability to bond large surface area materials such as activated carbon; that is, it must have adhesion and tackiness.

The binder resins and solid polymer electrolytes for electric double-layer capacitors that have hitherto been reported in the literature are all lacking in tackiness and adhesion, as well as other important properties. Hence, a need has been felt for further improvement.

Disclosure of the Invention The present invention was conceived in light of the above circumstances. One object of the invention is to provide polyurethane polymeric compounds (binder resins) in which a substituent having a large dipole moment has been introduced onto the polyurethane molecule to confer a high dielectric constant and the ability to dissolve ion conductive salts to a high concentration, which compounds also have a high tackiness that make them ideal as binders for firmly bonding large surface area materials and conductive materials, and are moreover capable of achieving an interfacial impedance comparable to that of an electrolyte solution. Further objects of the invention are to provide electrolyte compositions and solid polymer electrolytes for electric double-layer capacitors, which compositions and electrolytes are composed primarily of the above polymeric compound and an ion-conductive salt. Still further objects are to provide polarizable electrode-forming compositions and polarizable electrodes having a high adhesion and excellent dielectric properties, which compositions and electrodes are composed primarily of a polyurethane polymeric compound, a large surface area material and a conductive material. A yet further object of the invention is to provide electric double-layer capacitors composed of the foregoing compositions or components.

In the course of extensive and repeated investigations in order to achieve these aims, the inventors have made the following discoveries.

(1) Ion association readily arises in a low-dielectric-constant polymer matrix comprised of an ion-conductive solid polymer electrolyte containing a high concentration of ion-conductive salt, resulting in a decline in conductivity due to ion association.

(2) In such cases, introducing onto the polymer a substituent having a large dipole moment so as to increase the polarity of the matrix discourages ion association, thereby enhancing ionic conductivity.

(3) Introducing a substituent having a large dipole moment onto a polyurethane compound dramatically improves the compound's adhesion and tackiness.

Pursuing their investigations even further based on these findings, the inventors have found also that polyurethane polymeric compounds prepared by reacting an excess of an isocyanate compound with a polyol compound to form a polyurethane compound and reacting the hydroxyl group of an alcohol compound bearing a substituent having a large dipole moment with some or all of the remaining isocyanate groups on the polyurethane compound, wherein the substituent having a large dipole moment is coupled to the polyurethane compound through a NHCOO linkage, have a high dielectric constant, are able to dissolve ion-conductive salts to a high concentration, have excellent adhesive properties, enabling them to bond firmly with large surface area materials and conductive materials, and are capable of achieving an interfacial impedance comparable with that of electrolyte solutions. The inventors have additionally discovered that electrolyte compositions and solid polymeric electrolytes for electric double-layer capacitors which are composed primarily of such polyurethane polymeric compounds and ion-conductive salts have a high ionic conductivity and a high tackiness, and thus, in addition to serving as excellent electrolytes, also have the ability to firmly bond the electrode electrolyte with the separator. The inventors have also found that polarizable electrode-forming compositions composed primarily of a polyurethane polymeric compound, a large surface area material and a conductive material have a number of desirable characteristics, including high adhesion and outstanding dielectric properties, and are thus optimally suited as constituent materials in electric double-layer capacitors.

Accordingly, the present invention provides, firstly, an electrolyte composition for an electric double-layer capacitor, characterized by primarily comprising a polyurethane polymeric compound prepared by reacting an excess of an isocyanate compound with a polyol compound to form a polyurethane compound and reacting the hydroxyl group of an alcohol compound bearing a substituent having a large dipole moment with some or all of the remaining isocyanate groups on the polyurethane compound, wherein the substituent having a large dipole moment is coupled to the polyurethane compound through a NHCOO linkage; and an ion-conductive salt.

Secondly, the invention provides a solid polymer electrolyte for an electric double-layer capacitor, which electrolyte is produced by curing the foregoing electrolyte composition and has a bond strength as determined by a method in accordance with JIS K6854 (1994) of at least 0.8 kN/m.

Thirdly, the invention provides a polarizable electrode-forming composition characterized by primarily comprising a polyurethane polymeric compound prepared by reacting an excess of an isocyanate compound with a polyol compound to form a polyurethane compound and reacting the hydroxyl group of an alcohol compound bearing a substituent having a large dipole moment with some or all of the remaining isocyanate groups on the polyurethane compound, wherein the substituent having a large dipole moment is coupled to the polyurethane compound through a NHCOO linkage; a large surface area material; and a conductive material.

Fourthly, the invention provides a polarizable electrode produced by coating the above polarizable electrode-forming composition onto a current collector.

Fifthly, the invention provides an electric double-layer capacitor comprising a pair of polarizable electrodes with a separator disposed therebetween, characterized in that the above-described polarizable electrodes are used as the pair of polarizable electrodes, and the separator is composed of a separator substrate impregnated with an ion-conductive salt-containing solution.

Sixthly, the invention provides an electric double-layer capacitor comprising a pair of polarizable electrodes with a separator disposed therebetween, characterized in that the above-described polarizable electrodes are used as the pair of polarizable electrodes, and the separator is composed of a separator substrate coated or impregnated with the foregoing electrolyte composition for an electric double-layer capacitor.

And seventhly, the invention provides an electric double-layer capacitor comprising a pair of polarizable electrodes with a separator disposed therebetween, characterized in that the above-described polarizable electrodes are used as the pair of polarizable electrodes, and the separator is composed of the above-described solid polymer electrolyte for an electric double-layer capacitor.

BEST MODE FOR CARRYING OUT THE INVENTION

The invention is described more fully below.

The inventive electrolyte composition for an electric double-layer capacitor is composed primarily of a polyurethane polymeric compound prepared by reacting an excess of an isocyanate compound with a polyol compound to form a polyurethane compound and reacting the hydroxyl group of an alcohol compound bearing a substituent having a large dipole moment with some or all of the remaining isocyanate groups on the polyurethane compound, wherein the substituent having a large dipole moment is coupled to the polyurethane compound through a NHCOO linkage; and an ion-conductive salt.

The polyurethane polymeric compound is prepared by reacting (A) an isocyanate compound, (B) a polyol compound and (C) an alcohol compound bearing at least one hydroxyl group and at least one substituent having a large dipole moment.

The isocyanate compound serving as component A may be an alicyclic isocyanate, aliphatic isocyanate or aromatic isocyanate, so long as the molecule has at least two isocyanate groups. Illustrative examples of the isocyanate compound include methylenediphenyl diisocyanate (MDI), polymeric methylenediphenyl diisocyanate (polymeric MDI), tolylene diisocyanate (TDI), lysine diisocyanate (LDI), hydrogenated tolylene diisocyanate, hexamethylene diisocyanate (HDI), xylylene diisocyanate (XDI), hydrogenated xylylene diisocyanate, naphthylene diisocyanate (NDI), biphenylene diisocyanate, 2,4,6-triisopropylphenyl diisocyanate (TIDI), diphenyl ether diisocyanate, tolidine diisocyanate (TODI), isophorone diisocyanate (IPDI), 4,4'-dicyclohexylmethane diisocyanate (HMDI), tetramethylxylylene diisocyanate (TMXDI), 2,2,4-trimethylhexamethylene diisocyanate (TMHDI), 1,12-diisocyanatododecane (DDI), norbornane diisocyanate (NBDI), 2,4-bis(8-isocyanatooctyl)-1,3-dioctylcyclobutane (OCDI), and 2,2,4- and 2,4,4-trimethylhexamethylene diisocyanate (TMDI). These may be used alone or as combinations of two or more thereof.

Illustrative examples of the polyol compound serving as component B include polymeric polyols (e.g., polyethylene glycol, polypropylene glycol, ethylene glycol-propylene glycol copolymer), ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxy)benzene, p-xylylenediol, phenyldiethanolamine, methyldiethanolamine and 3,9-bis(2-hydroxy-1,1-dimethyl)-2,4,8,10-tetraoxaspiro[5,5]undecane.

Of these polyol compounds, suitable examples of polyfunctional polyols include trifunctional polyethylene glycol, trifunctional polypropylene glycol, trifunctional (ethylene glycol-propylene glycol) random copolymers, difunctional polyethylene glycol, difunctional polypropylene glycol and difunctional (ethylene glycol-propylene glycol) random copolymers. Polyfunctional polyols having a functionality of 4, 5 or more can also be used.

If a polymeric polyol is used as component B, its weight-average molecular weight (Mw) is preferably from 200 to 10,000, more preferably from 500 to 8,000, and most preferably from 1,000 to 6,000. A polymeric polyol having too small a weight-average molecular weight may lower the physical properties of the resulting polyurethane compound, whereas a weight-average molecular weight that is too large has a high viscosity and will at times make handling difficult.

The polymeric polyol has a content of polyethylene glycol (EO) units which is preferably at least 20%, more preferably at least 30%, even more preferably at least 50%, and most preferably at least 80%. Too low a content of polyethylene glycol units may lower the ability of the polyurethane polymeric compound to dissolve ion-conductive salts.

In the practice of the invention, the above polyol compounds may be used singly or as combinations of two or more thereof. The use of a difunctional polyol in combination with a trifunctional polyol is also possible. The mixing ratio of the difunctional polyol to the trifunctional polyol in this case is preferably 1:25 by weight, although this depends also on the molecular weight of the mixture.

If necessary, use can also be made of a monohydric alcohol. Examples of suitable monohydric alcohols include methanol, ethanol, butanol, ethylene glycol monoethyl ether and diethylene glycol monoethyl ether. Additional exemplary alcohols include polyethylene glycol monoethyl ether, polypropylene glycol monoethyl ether and ethylene glycol-propylene glycol copolymer monoethyl ether obtained by methyl or ethyl substitution at one end of polyethylene glycol, polypropylene glycol or ethylene glycol-propylene glycol copolymer.

In addition to above components A and B, an alcohol compound C having a substituent with a large dipole moment is also reacted to form the polyurethane polymeric compound of the invention.

That is, in electrolytes for electric double-layer capacitors, ion association readily arises within a low-dielectric-constant polymer matrix having a high ion-conductive metal salt concentration, leading to a decline in conductivity due to ion association. Introducing a substituent having a large dipole moment to enhance the polarity of the matrix has the effect of discouraging ion association, thereby improving conductivity. Moreover, investigations by the inventors have led to the surprising discovery that, in the case of polyurethane compounds, introducing a substituent having a large dipole moment greatly improves the adhesion and tackiness of the polyurethane compound. It is thus meaningful to introduce onto the polyurethane a substituent having a large dipole moment.

To achieve this end, an alcohol compound bearing at least one hydroxyl group and at least one substituent having a large dipole moment should be reacted with the isocyanate compound.

Examples of the alcohol compounds bearing at least one hydroxyl group and at least one substituent having a large dipole moment include aliphatic monohydric alcohols of 1 to 10 carbons, and preferably 1 to 5 carbons; and aromatic alcohols such as phenol, benzyl alcohol and cresol.

It is advantageous for the substituent having a large dipole moment to be one for which the group moment when the substituent is bonded to a phenyl, methyl or ethyl group is preferably at least 1.0 debye, more preferably from 1.0 to 5.0 debye, and most preferably from 1.2 to 4.5 debye. Illustrative examples include —$OCH_3$, —$SCH_3$, —$NH_2$, —I, —Br, —Cl, —F, —COOH, —$COOCH_3$, —CHO, —$COCH_3$, —$NO_2$ and —CN. In the present case, a neutral substituent is preferable to an ionic substituent, and —CN (cyano) is especially preferred.

Illustrative examples of the alcohol compound serving as component C include the amino-group bearing compounds aminoethanol, propanolamine, ethanolamine, acetylethanolamine and aminochlorophenol; the iodo group-bearing compounds iodoethanol and iodophenol; the bromo group-bearing compounds bromoethanol, bromopropanol and bromophenol; the chloro group-bearing compounds chloroethanol, chlorobutanol, chlorophenol and chlorocresol; the fluoro group-bearing compounds trifluoroethanol and tetrafluorophenol; the carboxyl group-bearing compounds salicylic acid and hydroxybutyric acid; the acetyl group-bearing compounds acetylnaphthol and N-acetylethanolamine; the nitro group-bearing compounds nitroethanol, nitrophenol and methylnitrophenol; and the cyano group-bearing compounds ethylene cyanohydrin, hydroxyacetonitrile, cyanophenol and cyanobenzyl alcohol.

The alcohol compound used as component C in the invention is thus an alcohol on which some of the hydrogen atoms have been substituted with the above groups having a large dipole moment, such as cyano. Preferred examples include substituted alcohols bearing a cyanobenzyl group, a cyanobenzoyl group, or a cyano group bonded to an alkyl group. The most preferred alcohol is one having a cyanoethyl group (—$CH_2CH_2CN$); that is, ethylene cyanohydrin.

In the present invention, special note should be taken of the fact that the deliberate introduction of a substituent having a large dipole moment onto the polyurethane resin results in a higher resin conductivity than if such a substituent is not introduced. Hence, the conductivity as well as the adhesion and tackiness of the polyurethane compound are considerably enhanced. The substance necessary for achieving this effect is component C, an alcohol compound bearing at least one hydroxyl group and at least one substituent having a large dipole moment. The amount of this alcohol compound included is important. It is advantageous for this amount to be such that, letting A be the isocyanate compound, B the polyol compound, and C the alcohol compound bearing at least one hydroxyl group and at least one substituent with a large dipole moment, the weight ratio C/(A+B+C) is in a range of preferably 0.01 to 0.4, more preferably 0.02 to 0.2, and most preferably 0.02 to 0.1. Increasing the amount of component C enhances the polarity of the resin, which in turn raises the conductivity and improves the adhesive properties.

In the practice of the invention, when the isocyanate compound A is reacted with the polyol compound B and the alcohol compound C, the stoichiometric ratio between [NCO] on the isocyanate compound and [OH] on the polyol and alcohol compounds is important.

That is, it is advantageous for [NCO] to be equal to or greater than [OH]. More specifically, the NCO index, defined as [NCO]/[OH], is preferably at least 1, more preferably from 1 to 2.3, even more preferably from 1.01 to 1.25, and most preferably from 1.04 to 1.25. Too small an NCO index may result in a decline in physical strength and a longer reaction time until curing is achieved. On the other hand, an NCO index which is too large may result in a loss of viscoelasticity, giving a cured product that is hard and brittle, in addition to which the remaining isocyanate groups may react with moisture in the air, causing deterioration over time.

When the isocyanate compound A, the polyol compound B, and the alcohol compound C bearing at least one hydroxyl group and at least one substituent having a large dipole moment are reacted, ordinary amounts of other suitable components such as urethane catalyst and defoamer may be added if necessary.

Illustrative, non-limiting examples of the urethane catalyst include amine catalysts such as 1,4-diazabicyclo[2.2.2] octane (DABCO), triethylamine and tetramethylbutylamine; and metal catalysts such as tin compounds (e.g., tin octanoate and dibutyltin dilaurate) and lead compounds.

The polymeric compound of the invention can be prepared by mixing and reacting above components A to C in the indicated amounts while including also, if necessary, other components such as a urethane catalyst and a defoamer.

The polyurethane polymeric compound of the invention is prepared by the reaction of the hydroxyl groups on the alcohol compound serving as component C with the isocyanate groups remaining on the polyurethane compound obtained by reacting an excess of the isocyanate compound serving as component A with the polyol compound serving as component B. The substituent having a large dipole moment bonds with the polyurethane compound through a NHCOO linkage. This can be represented by the formula below.

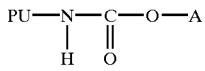

In the formula, PU stands for the polyurethane compound, and A is the alcohol residue bearing a substituent having a large dipole moment.

For example, when the alcohol in component C is ethylene cyanohydrin, the formula becomes

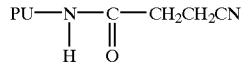

Because the polyurethane polymeric compound of the invention has a substituent with a large dipole moment, it possesses a high dielectric constant, a high tack strength, and the ability to dissolve ion-conductive salts to a high concentration, making it highly suitable as various types of electrochemical materials, such as binder resins and electrolytes for electric double-layer capacitors.

In addition, the polyurethane polymeric compound of the invention has the ability to dissolve ion-conductive salts to a high concentration. Moreover, because a substituent having a large dipole moment has been introduced onto the molecule, the dissolution of an ion-conductive salt to a high concentration does not readily give rise to ion association, and so there is no decline in ionic conductivity. Accordingly, the electrolyte composition for electric double-layer capacitors of the invention is composed primarily of a polyurethane polymeric compound and an ion-conductive salt.

Any ion-conductive salt employed in ordinary electrochemical devices may be used without particular limitation. Preferred examples include salts obtained by combining a quaternary onium cation of the general formula $R^1R^2R^3R^4N^+$ or $R^1R^2R^3R^4P^+$ (wherein $R^1$ to $R^4$ are each independently alkyls of 1 to 10 carbons) with an anion such as $BF_4^+$, $N(CF_3SO_2)_2^-$, $PF_6^-$ or $ClO_4^-$.

Illustrative examples include $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph—CH_2)PBF_4$ (wherein Ph stands for phenyl), $(C_2H_5)_4PPF_6$, $(C_2H_5)PCF_3SO_2$, $(C_2H_5)_4NBF_4$, $(C_4H_9)_4NBF_4$, $(C_6H_{13})_4NBF_4$, $(C_2H_5)_6NPF_6$, $LiBF_4$ and $LiCF_3SO_3$. These may be used alone or as combinations of two or more thereof.

The amount of the ion-conductive salt included in the electrolyte composition of the invention varies according to such factors as the type of ion-conductive salt used and the molecular weight of the polymeric compound. In general, however, the amount of ion-conductive salt used per 100 parts by weight of the polyurethane polymeric compound is preferably from 5 to 1,000 parts by weight, more preferably from 10 to 500 parts by weight, even more preferably from 10 to 100 parts by weight, and most preferably from 10 to 50 parts by weight. Too little ion-conductive salt gives a dilute ion conductor concentration, which may result in a conductivity that is in fact too low. On the other hand, the inclusion of too much ion-conductive salt often exceeds the ability of the polymer matrix to dissolve the ion-conductive salt, leading to salt deposition.

In addition to the polyurethane polymeric compound and the ion-conductive salt, the inventive electrolyte composition for electric double-layer capacitors may also have added thereto a solvent capable of dissolving the ion-conductive salt.

Illustrative examples of such solvents include chain ethers, such as dibutyl ether , 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and other solvents commonly used in electrochemical devices, such as amide solvents (e.g., N-methylformamide, N,N-dimethylformamide, N-methylacetamide and N-methylpyrrolidinone), carbonate solvents (e.g., diethyl carbonate, dimethyl carbonate, ethyl methyl carbonate, propylene carbonate, ethylene carbonate and styrene carbonate), and imidazolidinone solvents (e.g., 1,3-dimethyl-2-imidazolidinone). These solvents may be used singly or as mixtures of two or more thereof. Of these, the use of a nonaqueous carbonate solvent such as propylene carbonate is especially preferred.

The solvent is added in an amount of preferably 1 to 90% by weight, and especially 25 to 75% by weight, based on the overall weight of the electrolyte composition for electric double-layer capacitors. The addition of too much solvent may compromise the adhesive properties of the polyurethane polymeric compound.

In addition, during preparation of the inventive electrolyte composition for electric double-layer capacitors, a diluting solvent may be used to lower the viscosity for thin-film formation. Preferred conditions for such a solvent include, first of all, that it not react with the isocyanate compound; second, that it dissolve the isocyanate compound and the polyol compound; and third, that it be a relatively low-boiling solvent having a boiling point not higher than 120° C. Any solvent which satisfies these three conditions may be used without particular limitation. Examples of solvents suitable for this purpose include tetrahydrofuran, acetone, methyl ethyl ketone, toluene, 1,4-dioxane and ethylene glycol dimethyl ether.

In addition to a high bond strength, the electrolyte composition for electric double-layer capacitors of the invention also has a high ionic conductivity. For example, if such an electrolyte composition containing from 5 to 1,000 parts by weight of ion-conductive salt per 100 parts by weight of the polyurethane polymeric compound is cast onto a stainless steel sheet, and another stainless steel sheet is stacked on top thereof to give a sandwich construction which is then held at 80° C. for 4 hours to effect curing, the cured composition has a high ionic conductivity, as determined by complex conductivity measurement, of about $3 \times 10^{-4}$ S/cm.

The solid electrolyte composition for electric double-layer capacitors may be applied to a uniform thickness using any suitable thin film-forming (casting) technique such as roller coating with an applicator roll, screen coating, doctor blade coating, spin coating or bar coating.

Next, the electrolyte composition for electric double-layer capacitors of the invention is preferably heated at room temperature to 120° C. for a period of 0 to 7 hours, and more preferably at 60 to 100° C. for a period of 1 to 4 hours, to effect curing, thereby giving a solid polymer electrolyte (separator) for electric double-layer capacitors that has resilience.

With its high ionic conductivity, this solid polymer electrolyte for electric double-layer capacitors fulfills well the role of an electrolyte. In addition, because it also has a high bond strength, when placed between a pair of polarizable electrodes, it is able to firmly bond the two electrodes together.

The solid polymeric electrolyte for electric double-layer capacitors of the invention have a high bond strength, as measured based on peel-type bond strength test procedure standards for adhesives in accordance with JIS K6854 (1994), of preferably at least 0.8 kN/m, more preferably at least 1 kN/m, and most preferably at least 1.5 kN/m.

The invention is also directed at a polarizable electrode-forming composition which is composed primarily of a polyurethane polymeric compound, a large surface area material and a conductive material.

The polyurethane polymeric compound used for this purpose may be the same as the polyurethane polymeric compound in the above-described electrolyte composition for electric double-layer capacitors.

The large surface area material is typically a carbon material having a specific surface of preferably at least 500 m$^2$/g, more preferably at least 1,000 m$^2$/g, and most preferably from 1,500 to 3,000 m$^2$/g, and having an average particle size of preferably not more than 30 µm, and especially from 5 to 30 µm. At a specific surface and an average particle size outside the above respective ranges, it may be difficult to achieve an electric double-layer capacitor having a large electrostatic capacitance and a low resistance.

Preferred examples of such large surface area materials include activated carbon manufactured using an appropriate treatment process such as steam activation or molten KOH activation to activate a carbon material. Exemplary activated carbons include those manufactured from coconut shells, phenols, petroleum coke and polyacenes. Such activated carbons may be used singly or as combinations of two or more thereof. Of these, activated carbons derived from phenols, petroleum coke or polyacenes are preferred for achieving a large electrostatic capacitance.

The amount of the large surface area material included in the polarizable electrode-forming composition of the invention is preferably from 1,000 to 2,500 parts by weight, and especially 1,500 to 2,000 parts by weight, per 100 parts by weight of the polyurethane polymeric compound. The addition of too much large surface area material may lower the bond strength of the polarizable electrode-forming composition, resulting in poor adhesion to current collectors. On the other hand, too little large surface area material may have the effect of increasing the resistance and lowering the capacitance of polarizable electrodes produced from the polarizable electrode-forming composition.

The conductive material may be any suitable material capable of conferring electrical conductivity to the composition. Illustrative examples include carbon black, Ketjen black, acetylene black, carbon whiskers, natural graphite, artificial graphite, metallic fibers, and metallic powders such as titanium oxide and ruthenium oxide. Any one or combinations of two or more thereof may be used. Of these, Ketjen black and acetylene black, which are both types of carbon black, are preferred. The average particle size of the conductive material powder is preferably 10 to 100 nm, and especially 20 to 40 nm.

The amount of conductive material included in the polarizable electrode-forming composition of the invention is preferably 50 to 500 parts by weight, and especially 100 to 300 parts by weight, per 100 parts by weight of the polyurethane polymeric compound. The presence of too much conductive material in the composition reduces the proportion of the large surface area material, which may lower the electrostatic capacitance of the polarizable electrode obtained from the composition. On the other hand, the addition of too little conductive material may fail to confer adequate conductivity.

In addition to the polyurethane polymeric compound, large surface area material and conductive material described above, the polarizable electrode-forming composition of the invention may include also a diluting solvent. Illustrative examples of suitable diluting solvents include acetonitrile, tetrahydrofuran, acetone, methyl ethyl ketone, 1,4-dioxane and ethylene glycol dimethyl ether. Preferably, the diluting solvent is added in an amount of 80 to 150 parts by weight per 100 parts by weight of the overall polarizable electrode-forming composition.

The invention relates also to a polarizable electrode which is produced by coating the above polarizable electrode-forming composition onto a current collector.

The current collector is preferably made of metal. Aluminum and stainless steel are highly suitable as the metal current collectors because of their high corrosion resistance. Aluminum is especially advantageous on account of its light weight and low electrical resistance.

The current collector may be in any suitable form, such as a foil, expanded metal, a sheet of sintered metal fiber or a sheet of foam metal. A foil-type collector having a thickness of 20 to 100 µm is especially advantageous because it is easy to roll or stack and relatively inexpensive. When a metal foil is employed as the current collector, it is desirable to use a chemical, electrochemical or physical means to roughen the surface because this improves the closeness of contact between the polarizable electrode and the metal collector and lowers resistance.

The polarizable electrode of the invention may be formed by applying the polarizable electrode-forming composition onto the current collector to a uniform thickness using a suitable means such as roller coating with an applicator roll, screen coating, doctor blade coating, spin coating or bar coating. The polarizable electrode-forming composition-coated current collector is then held at 60 to 100° C. for 1 to 6 hours, giving the inventive polarizable electrode in a semisolid state.

The resulting polarizable electrode of the invention has a bond strength, as determined by a method in accordance with JIS K6854 (1994), of preferably at least 0.8 kN/m, more preferably at least 1 kN/m, and most preferably at least 1.5 kN/m.

The invention is also directed at an electric double-layer capacitor comprised of a pair of polarizable electrodes with a separator disposed therebetween. The polarizable electrodes described above are used as the pair of polarizable electrodes in the inventive capacitor, with both electrodes in the pair preferably being of the same construction.

A first type of separator that may be used in the inventive capacitor is produced by impregnating a separator substrate with an ion-conductive salt-containing solution. The separator substrate may be a material commonly used as a separator substrate in electric double-layer capacitors.

Illustrative examples of such separator substrates include polyethylene nonwoven fabric, polypropylene nonwoven fabric, polyester nonwoven fabric, PTFE porous film, kraft paper, sheet laid from a blend of rayon fibers and sisal fibers, manila hemp sheet, glass fiber sheet, cellulose-based electrolytic paper, paper made from rayon fibers, paper made from a blend of cellulose and glass fibers, and combinations thereof in the form of multilayer sheets.

The ion-conductive salt-containing solution is composed of an ion-conductive salt and a solvent capable of dissolving the salt, which may be of the same type as the ion-conductive salt and the solvent thereof exemplified above in connection with the electrolyte compositions for electric double-layer capacitors of the invention. The ion-conductive salt has a concentration in the ion-conductive salt-containing solution of preferably from 0.5 to 2.5 mol/L.

The separator produced by impregnating the separator substrate with this ion-conductive salt-containing solution may be placed between a pair of the inventive polarizable electrodes and a predetermined pressure applied to form an electric double-layer capacitor.

A second type of separator that may be used herein is produced by coating or impregnating a separator substrate with the inventive electrolyte composition for electric double-layer capacitors described above. The separator substrate used in this case is as described above.

Specifically, use can be made of either a separator produced by coating the inventive electrolyte composition for electric double-layer capacitors onto the separator substrate, or a separator produced by impregnating the composition into pores within the separator substrate. An electric double-layer capacitor may be produced by placing either of these separators between a pair of the inventive polarizable electrodes, applying a predetermined pressure, then holding the assembly at 60 to 100° C. for 1 to 8 hours to effect curing.

Use can also be made of a gel-like separator obtained by mixing the electrolyte composition for electric double-layer capacitors with a solvent capable of dissolving the ion-conductive salt. The solvent used for this purpose may be of the same type as the solvents mentioned above in connection with the electrolyte composition for electric double-layer capacitors of the invention.

A third type of separator that may be used herein is composed of a solid polymer electrolyte for electric double-layer capacitors produced by curing the above-described electrolyte composition for electric double-layer capacitors of the present invention. In this case, the electrolyte composition for electric double-layer capacitors of the invention is applied onto the surface of a polarizable electrode of the invention to a uniform thickness by a suitable means such as roller coating with an applicator roll, screen coating, doctor blade coating, spin coating or bar coating, or is cast using a doctor knife applicator.

Another polarizable electrode of the same construction is placed against this cast side and a pressure is applied to the assembly so as to give it a predetermined thickness, following which the assembly is held at 60 to 100° C. for 1 to 8 hours to effect curing, thereby forming an electric double-layer capacitor. Alternative use may be made of a gel-like separator obtained by mixing the electrolyte composition for electric double-layer capacitors with a solvent capable of dissolving the ion-conductive salt. The solvent may be the same as those mentioned above.

By using a binder resin composed of the polyurethane polymeric compound of the invention as the binder resin for the polarizable electrodes making up the inventive electric double-layer capacitor of the invention, the powdery large surface area material and the conductive material serving as constituents of the electrodes can be firmly bonded. When the electrolyte composition and solid polymer electrolyte (separator) for electric double-layer capacitors of the invention are used as the separator between the polarizable electrodes, a firm bond can be achieved between the polarizable electrodes and the separator. Moreover, because the binder resin and the separator (solid polymer electrolyte) share the same constituents, the interfacial resistance between the polarizable electrode and the solid polymer electrolyte can be lowered, making it possible to obtain a high-quality electric double-layer capacitor having an excellent performance.

An example of a method for manufacturing the electric double-layer capacitor of the present invention is described below.

(1) An isocyanate compound A, a polyol compound B, and an alcohol compound C bearing at least one hydroxyl and at least one substituent with a large dipole moment are mixed and thoroughly stirred, following which the mixture is degassed by reducing the pressure, giving a liquid I.

(2) A 1 mol/L solution of tetraethylammonium tetrafluoroborate $((C_2H_5)_4NBF_4)$ in the nonaqueous solvent propylene carbonate is added to above liquid I such as to give a 1:1 weight ratio of the polyurethane component to the nonaqueous solvent, and mixing is carried out, giving a liquid II.

(3) A powder mixture of activated carbon and carbon black in a weight ratio of 18:2 is mixed into above liquid I in a weight ratio of liquid I to the powder mixture of 1:20, giving what is referred to hereinafter as a "polarizable electrode-forming composition."

(4) The polarizable electrode-forming composition is cast onto an aluminum current collector using a doctor knife applicator, then held at 80° C. for 2 hours, giving a polarizable electrode in a semisolid state.

(5) Above liquid II is coated onto or impregnated into a separator substrate, which is then placed between the pair of polarizable electrodes obtained in (4), following which the assembly is subjected to pressure and held at 80° C. for 6 hours, giving an electric double-layer capacitor.

The electric double-layer capacitor of the invention thus obtained has an aluminum current collector/polarizable electrode/separator/polarizable electrode/aluminum current collector construction in which the polarizable electrodes and the separator are firmly bonded to each other. This capacitor can be charged and discharged, and functions effectively as an electric double-layer capacitor.

No particular limitation is imposed on the shape of the electric double-layer capacitor of the invention, although a film-like capacitor is preferred. One typical capacitor shape that may be used is a cylindrical shape arrived at by winding a continuous length of separator between a pair of continuous lengths of electrode to form an element, impregnating the element with a nonaqueous electrolyte solution, and enclosing the impregnated element in a cylindrical closed-end case. Another typical capacitor shape that may be used is an rectangular shape arrived at by alternately stacking a plurality of rectangular electrodes as the positive and negative electrodes with separators therebetween to form an element, then impregnating the element with a nonaqueous electrolyte solution, and enclosing the impregnated element in a rectangular closed-end case.

The electric double-layer capacitors of the invention can be miniaturized and have a high capacitance and a long operating life, all of which makes them well-suited to use in a variety of applications, including memory backup power supplies for electronic equipment such as personal computers and portable electronic devices, power supplies to protect personal computers and other equipment from sudden power outages, together with solar cells as energy storage systems for solar power generation, and in combination with batteries as load-leveling power supplies.

The following examples and comparative examples are provided to illustrate the invention, and are not intended to limit the scope thereof. In examples, all parts are by weight.

EXAMPLE 1

Electrolyte Composition for Electric Double-Layer Capacitor, and Solid Polymer Electrolyte for Electric Double-Layer Capacitor:

A mixture was prepared from 6.56 parts of the trifunctional ethylene glycol-propylene glycol random copolymer Sannix FA-103 (EO/PO=8/2; weight-average molecular weight (Mw)=3282; produced by Sanyo Chemical Industries, Ltd.), 0.27 part of the difunctional polyol 1,4-butanediol, and 1.00 part of ethylene cyanohydrin as the alcohol compound having a large dipole moment. Next, 3.66 parts of polymeric MDI (MR-200, produced by NPU) was added to the mixture, stirring and vacuum degassing were carried out, then 0.02 part of the catalyst NC-IM (produced by Sankyo Air Products Co., Ltd.) and 0.01 part of a defoamer (produced by Bik Chemie Japan Co., Ltd.) were added, thereby forming a polyurethane polymeric compound (referred to hereinafter as "liquid I").

Tetraethylammonium tetrafluoroborate $((C_2H_5)_4NBF_4)$ (3.19 parts) dissolved in a suitable amount of tetrahydrofuran was added to the resulting polyurethane polymeric compound such as to set the combined weight of $(C_2H_5)_4NBF_4$ and polyurethane polymeric compound at 1 kg. The resulting solution was held under reduced pressure to allow the tetrahydrofuran to evaporate, giving a polyurethane polymer compound-supported electrolyte complex (hereinafter referred to as "liquid II").

Liquid II was cast using a doctor knife applicator and held at 80° C. for 6 hours, thus forming a solid polymer electrolyte (cured complex) for electric double-layer capacitors.

The infrared absorption spectrum of the resulting cured complex was found to have urethane bond (R—O—CO—N—) absorption at 1740 to 1690 cm$^{-1}$ and cyano group absorption at 2230 to 2130 cm$^{-1}$, confirming that the —$CH_2CH_2CN$ groups within the polyurethane compound prepared from the polyol compound and the isocyanate compound are bonded through NHCOO linkages. Moreover, the complex did not dissolve in the solvent, demonstrating that it was a three-dimensional crosslinked structure.

The conductivity and bond strength of the cured complex were measured as described below. In addition, the cured complex was held at 100° C. for 5 hours, and the percent weight loss by evaporation was measured. The results are shown in Table 2.

Conductivity:

The cured complex was rendered into a 200 $\mu$m film, sandwiched between two copper sheets, and the conductivity was determined by AC impedance measurement.

Bond Strength:

The bond strength was determined based on the peel-type bond strength test procedure standards for adhesives set forth in JIS K6854. Specifically, copper sheets having a thickness of 0.6 mm, a width of 25.5±0.2 mm and a length of 300 mm that had been surface-treated with sandpaper were used as the adherend. The electrolyte composition for electric double-layer capacitors was applied between the copper adherends as the bonding layer, then held at 80° C. for 6 hours to effect curing and bonding, thereby giving a T-peel test piece. Both ends of the test piece were attached to fixable clamps on a testing machine, and measurement was carried out. The crosshead was moved at a speed of 100±10 mm/min, and crosshead movement was continued until the portion of the test piece remaining bonded was about 10 mm. The measurement results were subjected to best-fit straight line approximation, and the peel-type bond strength was determined from the resulting peel load in accordance with JIS Z8401.

EXAMPLE 2

A solid polymer electrolyte (cured complex) for electric double-layer capacitors was prepared by the same method as in Example 1, except that the amount of ethylene cyanohydrin was changed to 0.57 part and the amount of polymeric MDI (MR-200, from NPU) was changed to 2.81 parts in order to keep [NCO]/[OH]≧1.

The resulting cured complex was a three-dimensional crosslinked structure. The presence of urethane bonds and cyano groups was confirmed by analysis.

The conductivity and bond strength of the cured complex were measured by the same methods as in Example 1. In addition, the cured complex was held at 100° C. for 5 hours, and the percent weight loss by evaporation was measured. The results are presented in Table 2.

EXAMPLE 3

A solid polymer electrolyte (cured complex) for electric double-layer capacitors was prepared by the same method as in Example 1, except that the amount of ethylene cyanohydrin was changed to 0.29 part and the amount of polymeric MDI (MR-200, from NPU) was changed to 2.25 parts in order to keep [NCO]/[OH]≧1.

The resulting cured complex was a three-dimensional crosslinked structure. The presence of urethane bonds and cyano groups was confirmed by analysis.

The conductivity and bond strength of the cured complex were measured by the same methods as in Example 1. In addition, the cured complex was held at 100° C. for 5 hours, and the percent weight loss by evaporation was measured. The results are presented in Table 2.

EXAMPLE 4

A solid polymer electrolyte (cured complex) for electric double-layer capacitors was prepared by the same method as in Example 1, except that 1.69 parts of cyanophenol was used instead of ethylene cyanohydrin.

The resulting cured complex was a three-dimensional crosslinked structure. The presence of urethane bonds and cyano groups was confirmed by analysis.

The conductivity and bond strength of the cured complex were measured by the same methods as in Example 1. In addition, the cured complex was held at 100° C. for 5 hours, and the percent weight loss by evaporation was measured. The results are presented in Table 2.

EXAMPLE 5

A solid polymer electrolyte (cured complex) for electric double-layer capacitors was prepared by the same method as in Example 1, except that 1.13 parts of 2-chloroethanol was used instead of ethylene cyanohydrin.

The resulting cured complex was a three-dimensional crosslinked structure. The presence of urethane bonds and cyano groups was confirmed by analysis.

The conductivity and bond strength of the cured complex were measured by the same methods as in Example 1. In addition, the cured complex was held at 100° C. for 5 hours, and the percent weight loss by evaporation was measured. The results are presented in Table 2.

EXAMPLE 6

A solid polymer electrolyte (cured complex) for electric double-layer capacitors was prepared by the same method as in Example 1, except that 4.94 parts of the ethylene glycol-propylene glycol random copolymer Unilube 50TG-32U (EO/PO=5/5; Mw=2468; produced by NOF Corp.) was used instead of the trifunctional ethylene glycol-propylene glycol random copolymer Sannix FA-103.

The resulting cured complex was a three-dimensional crosslinked structure. The presence of urethane bonds and cyano groups was confirmed by analysis.

The conductivity and bond strength of the cured complex were measured by the same methods as in Example 1. In addition, the cured complex was held at 100° C. for 5 hours, and the percent weight loss by evaporation was measured. The results are presented in Table 2.

EXAMPLE 7

A solid polymer electrolyte (cured complex) for electric double-layer capacitors was prepared by the same method as in Example 1, except that 1.2 parts of polyethylene glycol 400 as used instead of the difunctional polyol 1,4-butanediol.

The resulting cured complex was a three-dimensional crosslinked structure. The presence of urethane bonds and cyano groups was confirmed by analysis.

The conductivity and bond strength of the cured complex were measured by the same methods as in Example 1. In addition, the cured complex was held at 100° C. for 5 hours, and the percent weight loss by evaporation was measured. The results are presented in Table 2.

EXAMPLE 8

Nonaqueous Solvent-Containing Electrolyte Composition for Electric Double-Layer Capacitor, and Solid Polymer Electrolyte for Electric Double-Layer Capacitor:

A mixture was prepared from 6.56 parts of the trifunctional ethylene glycol-propylene glycol random copolymer Sannix FA-103 (EO/PO=8/2; Mw=3282; produced by Sanyo Chemical Industries, Ltd.), 0.27 part of the difunctional polyol 1,4-butanediol, and 1.00 part of ethylene cyanohydrin as the alcohol compound having a large dipole 20 moment. Next, 3.66 parts of polymeric MDI (MR-200, produced by NPU) was added to the mixture, stirring and vacuum degassing were carried out, then 0.02 part of the catalyst NC-IM (produced by Sankyo Air Products Co., Ltd.) and 0.01 part of a defoamer (produced by Bik Chemie Japan Co., Ltd.) were added, thereby forming a polyurethane polymeric compound (referred to hereinafter as "liquid I").

The polyurethane polymeric compound was dissolved in 11.49 parts of the nonaqueous solvent propylene carbonate containing 1 mol/L of dissolved tetraethylammonium tetrafluoroborate $((C_2H_5)_4NBF_4)$, such as to set the weight ratio of the polyurethane component to the nonaqueous solvent at 1:1, thereby giving a polyurethane polymeric compound-supported electrolyte complex (hereinafter referred to as "liquid II") which is an electrolyte composition for electric double-layer capacitors.

Liquid II (electrolyte composition) was cast using a doctor knife applicator and held at 80° C. for 6 hours, thus forming a solid polymer electrolyte (cured complex) for electric double-layer capacitors.

The resulting cured complex was a three-dimensional crosslinked structure. The presence of urethane bonds and cyano groups was confirmed by analysis.

The conductivity and bond strength of the cured complex thus obtained were measured by the same methods as in Example 1. The results are presented in Table 2.

EXAMPLE 9

A solid polymer electrolyte (cured complex) for electric double-layer capacitors was prepared by the same method as in Example 8, except that the amount of the nonaqueous solvent propylene carbonate containing 1 mol/L of dissolved tetraethylammonium tetrafluoroborate $((C_2H_5)_4NBF_4)$ was changed to 34.47 parts, thereby setting the weight ratio of polyurethane component to nonaqueous solvent at 1:3.

The resulting cured complex was a three-dimensional crosslinked structure. The presence of urethane bonds and cyano groups was confirmed by analysis.

The conductivity and bond strength of the cured complex were measured by the same methods as in Example 1. The results are presented in Table 2.

COMPARATIVE EXAMPLE 1

A solid polymer electrolyte (cured complex) for electric double-layer capacitors was prepared by the same method as in Example 1, except that 5.61 parts of the monofunctional olyethylene glycol monoalkyl ether Uniox M-400 (weight-average molecular weight (Mw)=400; produced by NOF Corp.), which lacks a substituent having a large dipole moment, was used instead of ethylene cyanohydrin.

The resulting cured complex was a three-dimensional crosslinked structure. The presence of urethane bonds was confirmed by analysis.

The conductivity and bond strength of the cured complex were measured by the same methods as in Example 1. In addition, the cured complex was held at 100° C. for 5 hours, and the percent weight loss by evaporation was measured. The results are presented in Table 2.

The resulting composition was held at 80° C. for 6 hours, thereby forming a solid polymer electrolyte for electric double-layer capacitors.

COMPARATIVE EXAMPLE 2

Tetraethylammonium tetrafluoroborate $((C_2H_5)_4NBF_4)$ (2.77 parts) and polyethylene glycol 2000 (10.00 parts) were dissolved in a suitable amount of tetrahydrofuran to a concentration of 1 mole of $(C_2H_5)_4NBF_4$ per kilogram of the total weight. The resulting composition was cast using a doctor knife applicator and held under applied pressure in a 60° C oven for 1 hour to evaporate off the tetrahydrofuran, thereby giving a conductive solid polymer electrolyte (solid electrolyte for electric double-layer capacitors).

The resulting solid polymer electrolyte was measured for conductivity, bond strength and percent weight loss by evaporation using the same methods as in Example 1. The results are shown in Table 2.

PEG 400: Polyethylene glycol 400
MR-200: Polymeric MDI (produced by NPU)
M-400: The monofunctional polyethylene glycol monoalkyl ether Uniox M-400 (Mw=400), produced by NOF Corp.

TABLE 2

|  | Conductivity (S/cm) | Bond strength (kN/m) | Percent weight loss by evaporation (%) |
| --- | --- | --- | --- |
| Example 1 | $4.70 \times 10^{-4}$ | 2.59 | <0.1 |
| Example 2 | $4.20 \times 10^{-4}$ | 2.31 | <0.1 |
| Example 3 | $3.90 \times 10^{-4}$ | 2.08 | <0.1 |
| Example 4 | $3.50 \times 10^{-4}$ | 1.66 | <0.1 |
| Example 5 | $3.00 \times 10^{-4}$ | 1.59 | <0.1 |
| Example 6 | $4.50 \times 10^{-4}$ | 2.49 | <0.1 |
| Example 7 | $4.30 \times 10^{-4}$ | 2.39 | <0.1 |
| Example 8 | $1.80 \times 10^{-3}$ | 1.00 | — |
| Example 9 | $3.60 \times 10^{-3}$ | 0.82 | — |
| Comparative Example 1 | $4.50 \times 10^{-5}$ | 0.77 | <0.1 |
| Comparative Example 2 | $2.40 \times 10^{-5}$ | <0.01 | <0.1 |

According to the present invention, there can be obtained electrolyte compositions and solid polymer electrolytes, for

TABLE 1

| | Component A | | Component B | Component C | | |
| --- | --- | --- | --- | --- | --- | --- |
| | Trifunctional Polyol (g) | Difunctional polyol (g) | Polyfunctional isocyanate (g) | Alcohol compound with large dipole moment (g) | Blending Ratio[1] | NCO Index[2] |
| EX1 | FA-103 (6.56) | 1,4-butanediol (0.27) | MR-200 (3.66) | ethylene cyanohydrin (1.00) | 0.087 | 1.04 |
| EX2 | FA-103 (6.56) | 1,4-butanediol (0.27) | MR-200 (2.81) | ethylene cyanohydrin (0.57) | 0.056 | 1.04 |
| EX3 | FA-103 (6.56) | 1,4-butanediol (0.27) | MR-200 (2.25) | ethylene cyanohydrin (0.29) | 0.031 | 1.04 |
| EX4 | FA-103 (6.56) | 1,4-butanediol (0.27) | MR-200 (3.66) | cyanophenol (1.69) | 0.14 | 1.04 |
| EX5 | FA-103 (6.56) | 1,4-butanediol (0.27) | MR-200 (3.66) | 2-chloroethanol (1.13) | 0.098 | 1.04 |
| EX6 | 50TG-32U (4.94) | 1,4-butanediol (0.27) | MR-200 (3.66) | ethylene cyanohydrin (1.00) | 0.101 | 1.04 |
| EX7 | FA-103 (6.56) | PEG 400 (1.2) | MR-200 (3.66) | ethylene cyanohydrin (1.00) | 0.081 | 1.04 |
| EX8 | FA-103 (6.56) | 1,4-butanediol (0.27) | MR-200 (3.66) | ethylene cyanohydrin (1.00) | 0.087 | 1.04 |
| EX9 | FA-103 (6.56) | 1,4-butanediol (0.27) | MR-200 (3.66) | ethylene cyanohydrin (1.00) | 0.087 | 1.04 |
| CE1 | FA-103 (6.56) | 1,4-butanediol (0.27) | MR-200 (3.66) | M-400 (5.61) | 0.028 | 1.04 |
| CE2 | | polyethylene glycol 2000 (10.0) | | | — | — |

[1] Blending ratio = C/(A + B + C)
[2] NCO index = [NCO]/[OH]

FA-103: The trifunctional ethylene glycol-propylene glycol random copolymer Sannix FA-103 (EO/PO=8/2; Mw=3282), produced by Sanyo Chemical Industries, Ltd.
50TG-32U: The ethylene glycol-propylene glycol random copolymer Unilube 50TG-32U (EO/PO=5/5; Mw=2468), produced by NOF Corp.
Difunctional polyol: 1,4-Butanediol use in electric double-layer capacitors, which have a high ionic conductivity and a high bond strength. The electrolyte compositions and solid polymer electrolytes of the invention are composed primarily of an ion-conductive salt, and a polyurethane polymeric compound which has a high dielectric constant, can dissolve the ion-conductive salt to a high concentration, has excellent adhesive properties, and is capable of achieving an interfacial impedance comparable to that of an electrolyte solution.

EXAMPLE 10
Polarizable Electrode-forming Composition and Polarizable Electrode:

Phenol-derived activated carbon (manufactured by Kansai Netsukagaku K.K.; specific surface, 1860 m²/g; average particle size, 16 μm) as the large surface area material and carbon black (average particle size, 20 nm) as the conductive material were added in a weight ratio (activated carbon/carbon black) of 18:2 and mixed.

The resulting powder mixture, liquid I of Example 1, and acetonitrile were mixed in a weight ratio (powder mixture/liquid I/acetonitrile) of 20:1:30 to form a polarizable electrode-forming composition.

The polarizable electrode-forming composition was cast onto an aluminum current collector using a doctor knife applicator, then held at 80° C. for 2 hours to evaporate off the acetonitrile, thereby giving a polarizable electrode in a semisolid state.

EXAMPLE 11
Electric Double-Layer Capacitor (1):

A separator substrate (PTFE porous film) impregnated with a 1 mol/L solution of tetraethylammonium tetrafluoroborate $((C_2H_5)_4NBF_4)$ dissolved in the nonaqueous solvent propylene carbonate was placed between a pair of the polarizable electrodes obtained in Example 10 and pressure was applied, giving a film-type electric double-layer capacitor.

The film-type electric double-layer capacitor thus obtained had an aluminum current collector/polarizable electrode/separator/polarizable electrode/aluminum current collector construction, was capable of being charged and discharged, and functioned effectively as an electric double-layer capacitor.

EXAMPLE 12
Electric Double-Layer Capacitor (2):

The liquid II of Example 1 was coated onto or impregnated into a separator substrate (PTFE porous film) to give a separator.

The separator was placed between a pair of the polarizable electrodes produced in Example 10. Pressure was applied to the assembly, after which it was held at about 80° C. for 6 hours to effect curing. This caused the liquid II of Example 1 present in the separator between the pair of polarizable electrodes produced in Example 10 to thermally polymerize, giving a film-type electric double-layer capacitor The film-type electric double-layer capacitor thus obtained had an aluminum current collector/polarizable electrode/separator/polarizable electrode/aluminum current collector construction, and functioned effectively as an electric double-layer capacitor.

EXAMPLE 13
Electric Double-Layer Capacitor (3)

A film-type electric double-layer capacitor was produced in the same way as in Example 12 using a pair of the polarizable electrodes produced in Example 10, except that the liquid II used was that prepared in Example 8.

The resulting film-type electric double-layer capacitor had an aluminum current collector/polarizable electrode/separator/polarizable electrode/aluminum current collector construction, and functioned effectively as an electric double-layer capacitor.

EXAMPLE 14
Electric Double-Layer Capacitor (4)

The liquid II prepared in Example 1 was placed in a slight excess on the surface of the polarizable electrode produced in Example 10, another polarizable electrode of the same construction was stacked on top thereof, and pressure was applied such as to make the gap between the two polarizable electrodes 25 μm. The assembly was then held at about 80° C. for 6 hours to effect curing.

This caused the liquid II of Example 1 disposed between the pair of polarizable electrodes produced in Example 10 to thermally polymerize and form a solid polymer electrolyte layer, thereby giving a film-type electric double-layer capacitor.

The film-type electric double-layer capacitor thus obtained had an aluminum current collector/polarizable electrode/solid polymer electrolyte layer/polarizable electrode/aluminum current collector construction in which the electrodes and the separator were firmly bonded. The capacitor was capable of being charged and discharged, and functioned effectively as an electric double-layer capacitor.

EXAMPLE 15
Electric Double-Layer Capacitor (5)

A film-type electric double-layer capacitor was produced in the same way as in Example 14 using a pair of the polarizable electrodes produced in Example 10, except that the liquid II used was that prepared in Example 8.

The resulting film-type electric double-layer capacitor had an aluminum current collector/polarizable electrode/solid polymer electrolyte layer/polarizable electrode/aluminum current collector construction, and functioned effectively as an electric double-layer capacitor.

As is apparent from the above examples, the polarizable electrode-forming compositions and polarizable electrodes of the invention, which are composed primarily of a polyurethane polymeric compound, a large surface area material and a conductive material, are endowed with a high adhesion and the ability to firmly bond the large surface area material and other constituents. Moreover, the electric double-layer capacitor of the invention which is composed of such electrodes, given its high ionic conductivity, high dielectric constant, and the ability of the pair of polarizable electrodes therein to bond securely to a separator (electrolyte), has excellent qualities as an electric double-layer capacitor.

What is claimed is:

1. An electrolyte composition for an electric double-layer capacitor, comprising:

100 parts by weight of a polyurethane polymeric compound prepared by reacting an excess of an isocyanate compound with a polyol compound to form a polyurethane compound and reacting the hydroxyl group of an alcohol compound having a substituent having a large dipole moment with some or all of the remaining isocyanate groups on the polyurethane compound, wherein said substituent having a large dipole moment is coupled to said polyurethane compound through a NHCOO linkage; and 5 to 1000 parts by weight of an ion-conductive salt.

2. A solid polymer electrolyte for an electric double-layer capacitor, which electrolyte is produced by curing the electrolyte composition of claim 1 and has a bond strength as determined by a method in accordance with JIS K6854 (1994) of at least 0.8 kN/m.

3. A polarizable electrode-forming composition comprising:

100 parts by weight of a polyurethane polymeric compound prepared by reacting an excess of an isocyanate compound with a polyol compound to form a polyurethane compound and reacting the hydroxyl group of an alcohol compound having a substituent having a large dipole moment with some or all of the remaining isocyanate groups on the polyurethane compound, wherein said substituent having a large dipole moment is coupled to said polyurethane compound through a NHCOO linkage;

1000 to 2500 parts by weight of a large surface area material; and 50 to 500 parts by weight of a conductive material.

4. A polarizable electrode produced by coating the polarizable electrode-forming composition of claim 3 onto a current collector.

5. The polarizable electrode of claim 4 which has a bond strength as determined by a method in accordance with JIS K6854 (1994) of at least 0.8 kN/m.

6. An electric double-layer capacitor comprising a pair of polarizable electrodes with a separator disposed therebetween, characterized in that the pair of polarizable electrodes are polarizable electrodes according to claim 4 or 5, and the separator is comprised of a separator substrate impregnated with an ion-conductive salt-containing solution.

7. An electric double-layer capacitor comprising a pair of polarizable electrodes with a separator disposed therebetween, characterized in that the pair of polarizable electrodes are polarizable electrodes according to claim 4 or 5, and the separator is comprised of a separator substrate coated or impregnated with an electrolyte composition for an electric double-layer capacitor comprising:

100 parts by weight of a polyurethane polymeric compound prepared by reacting an excess of an isocyanate compound with a polyol compound to form a polyurethane compound and reacting the hydroxyl group of an alcohol compound having a substituent having a large dipole moment with some or all of the remaining isocyanate groups on the polyurethane compound, wherein said substituent having a large dipole moment is coupled to said polyurethane compound through a NHCOO linkage; and 5 to 1000 parts by weight of an ion-conductive salt.

8. An electric double-layer capacitor comprising a pair of polarizable electrodes with a separator disposed therebetween, characterized in that the pair of polarizable electrodes are polarizable electrodes according to claim 4 or 5, and the separator is comprised of a solid polymer electrolyte for an electric double-layer capacitor formed by curing an electrolyte composition comprised of:

100 parts by weight of a polyurethane polymeric compound prepared by reacting an excess of an isocyanate compound with a polyol compound to form a polyurethane compound and reacting the hydroxyl group of an alcohol compound having a substituent having a large dipole moment with some or all of the remaining isocyanate groups on the polyurethane compound, wherein said substituent having a large dipole moment is coupled to said polyurethane compound through a NHCOO linkage; and 5 to 1000 parts by weight of an ion-conductive salt, said cured electrolyte composition having a bond strength as determined by a method in accordance with JIS K6854 (1994) of at least 0.8 kN/m.

9. The composition of claims 1 or 3, wherein said polyol compound is an aliphatic monohydric alcohol having from 1 to 10 carbon atoms or an aromatic alcohol which has a substituent having at least 1.0 debye when the substituent is bonded to a phenyl, methyl or ethyl group as the substituent having the large dipole moment.

10. The composition of claims 1 or 3, wherein said substituent having a large dipole moment is a cyano group.

11. The composition of claims 1 or 3, wherein the weight ratio of alcohol compound having at least one hydroxyl group and at least one substituent having a large dipole moment to the combined amount of isocyanate compound, polyol compound and alcohol compound bearing at least one hydroxyl group and at least one substituent having a large dipole moment ranges from 0.01 to 0.4, and the weight ratio of isocyanate to hydroxyl is at least 1.

12. The composition of claim 1 wherein said ion conductive salt is obtained by combining a quaternary onium cation of the formula $R^1R^2R^3R^4N^+$ or $R^1R^2R^3R4P^+$ wherein $R^1$ to $R^4$ are each independently alkyl groups having 1 to 10 carbon atoms with an anion.

13. The composition of claim 12, wherein said anion is selected from the group consisting of $BF_4^+$, $N(CF_3SO_2)_2^-$, $PF_6^-$ and $ClO_4^-$.

14. The composition of claims 1 or 3, further comprising a solvent capable of dissolving the ion-conductive salt.

15. The composition of claim 3, wherein said large surface area material is a carbon material having a specific surface area of at least 500 $m^2/g$, and having an average particle size of not more than 30 um.

16. The composition of claims 1 or 3, further comprising a diluting solvent.

17. The composition of claim 3, wherein said large surface area material has a specific surface area ranging from 1500 to 3000 $m^2/g$.

18. The composition of claim 3, wherein said large surface area material comprises activated carbon.

19. The composition of claim 3, wherein said conductive material is selected from the group consisting of carbon black, Ketjen black, acetylene black, carbon whiskers, natural graphite, artificial graphite, metallic fibers, and metallic powder.

20. The composition of claim 3, wherein said conductive material is present in an amount of from 50 to 500 parts by weight.

\* \* \* \* \*